INVENTOR
BORYS ZUK
BY H. Christoffer
ATTORNEY

LOGIC CIRCUIT

Filed Aug. 6, 1968 2 Sheets-Sheet 2

INVENTOR
BORYS ZUK
BY H. Christoffersen
ATTORNEY

United States Patent Office 3,539,823

Patented Nov. 10, 1970

3,539,823

LOGIC CIRCUIT

Borys Zuk, Somerville, N.J., assignor to RCA Corporation, a corporation of Delaware Filed Aug. 6, 1968, Ser. No. 750,586
Int. Cl. H03k *19/34*
U.S. Cl. 307—215 9 Claims

ABSTRACT OF THE DISCLOSURE

A logic circuit to provide two related "NORED" output functions at two output points. Each output function includes two sets of variables. The first set of one function is identical to the first set of the other function and the variables in the second set of one function are the complement of the variables in the second set of the other function. A parallel combination of transistors connected between the two output points is used to generate the first set of each function. The transistors are bidirectional devices capable of conducting current in one and the opposite direction, whereby the two output points of a pair share the transmission path provided by the parallel combination of transistors.

BACKGROUND OF THE INVENTION

The minimization of components to perform a function is of prime importance since yield and reliability are inverse functions of the number of components used.

The present invention describes a minimization scheme to realize two different, though related, logic functions by using transistors as transmission gates between the two outputs at which the functions are produced.

The minimization of components is best illustrated by an example comparing the invention to the prior art. According to the prior art, to obtain the functions $$Y_1=\overline{A+B+C}$$

and $Y_2=\overline{\bar{A}+B+C}$ (given the variables A, B and C and their complements) requires at least one transistor per variable in each function. Thus, a total of six transistors would be required to obtain $Y_1$ and $Y_2$.

The invention notes that two functions such as $Y_1$ and $Y_2$ expressed in the alternative form—that is, as a "NOR" or as an "OR" function—have the following properties: (1) they have the same number of variables—three; (2) they have some variables in common—B and C; and (3) the remaining variables of one function are the complements of the remaining variables of the other function—A and $\bar{A}$. Property (2) is the key to minimization. Each variable is, as before, represented by one transistor, but instead of duplicating the transistor for each function, as in the prior art, the two functional circuits share the transistor common to each function. This is done by using the bidirectional properties of the transistor to create a transmission path between the two outputs. Property (3) enables two functional circuits to share a common transmission path based on the general rule that: $A+\bar{A}X=A+X$; and $\bar{A}+AX=\bar{A}+X$, where A represents a variable and X represents either a variable or a product or sum of variables. According to the invention, to perform the functions $Y_1$ and $Y_2$ as defined above, only four transistors are necessary, resulting in a net saving of two transistors. Generally, two output functions composed of N variables and each having $k$ common terms may share $k$ transistors for a saving of $k$ transistors per paired outputs, where $1 \leqq k \leqq (N-1)$.

The invention is especially applicable to decoding circuits where many similar combinations of the same variables exist. Also, applying the invention to complementary transistor decoding circuits decreases the large number of components presently required and does so without using any transistors in the follower output mode. This ensures low power consumption and high speed of operation. Additionally, since the number of components per function has been reduced and since the yield and the reliability are inversely proportional to the number of components, a higher yield and a more reliable system is achieved by means of the invention.

BRIEF SUMMARY OF THE INVENTION

A logic circuit embodying the invention has two output points coupled by means of one or more transistors connected in parallel which act as transmission gates conducting current in one and the opposite direction. The bidirectional property of the coupling transistors is used to generate the common terms present in the different output functions at the two output points. A pair of outputs therefore share the transmission path of the parallel combination of transistors.

Each output point is also connected to a first junction point by means of one or more transistors connected in parallel. The signals applied to the transistors connected between one of the two output points and the first junction point are the complements of the signals applied to the transistors connected between the other of the two output points and the first junction point.

DETAILED DESCRIPTION

Apparatus embodying the invention comprises a logic circuit to obtain two different but related functions of the same variables, using a minimum number of components. Insulated-gate field-effect transistors (IGFETS) of the enhancement type are preferred to practice the invention. However, any of the other known types of transistors—such as field-effect devices (FET) or the bipolar transistors may be used. Transistor characteristics are well-known and need not be described in detail. Suffice it to say that: (1) the devices used have a first electrode and a second electrode defining a conduction path and a control electrode whose applied potential determines the conductivity of the conduction path; and (2) the devices used are bidirectional in the sense that when an enabling signal is applied to the control electrode, current can flow in either direction in the conduction path defined by the first and second electrodes.

In the discussion to follow, it will be convenient to discuss operation in Boolean terms. The convention arbitrarily adopted is that the most positive voltage used in the system represents the binary digit 0 and the least positive voltage represents the binary digit 1. To further simplify the explanation of the circuit operation, it will sometimes be stated that a 1 or a 0 is applied to a circuit or obtained from a circuit rather than stating that a voltage which is indicative of a 1 or a 0 is applied to or derived from a circuit.

Figures 1, 2:
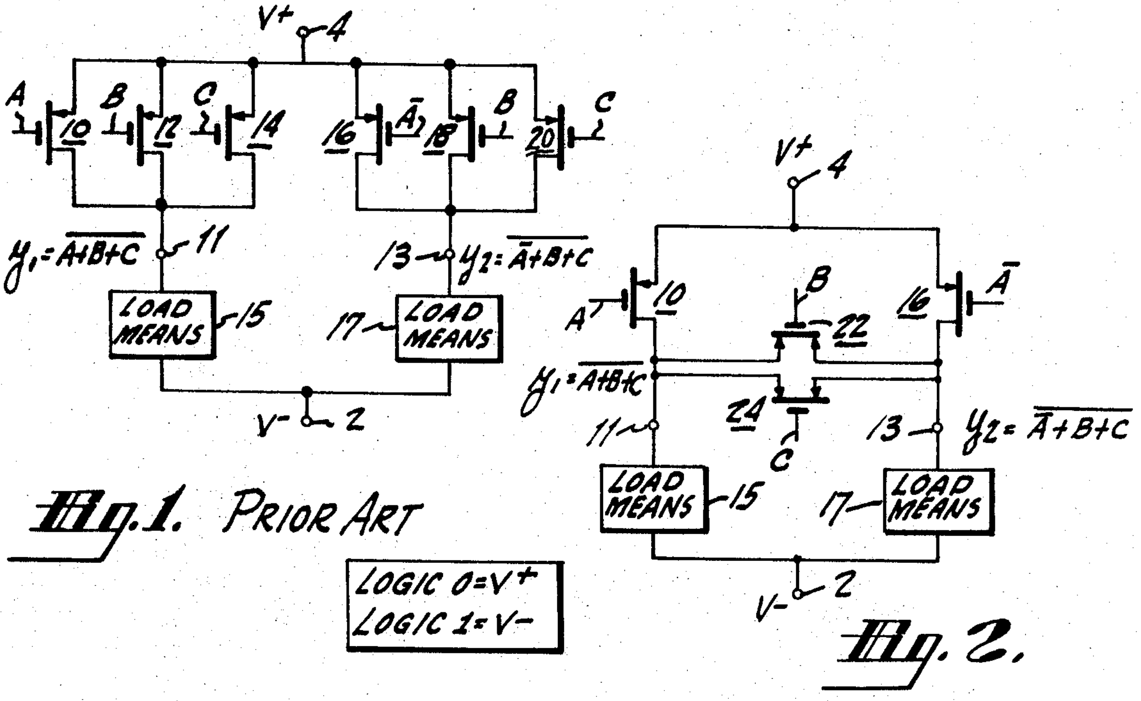
FIG. 1. PRIOR ART, FIG. 2.
FIG. 1 is a schematic drawing of a prior art NOR gate.
FIG. 2 is a schematic drawing of a logic gate embodying the invention.

The circuit of FIG. 1 shows two NOR gates according to the prior art used to obtain the functions $Y_1$ and $Y_2$ discussed above. Transistors 10, 12 and 14 are connected in parallel between terminal 4 and output point 11 and transistors 16, 18 and 20 are connected in parallel between terminal 4 and output point 13. Each output point is connected to terminal 2 by a separate load means, and a source of $V^+$ potential is connected to terminal 4 and a source of $V^-$ potential is connected to terminal 2. The sources may be batteries, for example, each having one terminal grounded.

The operation of the FIG. 1 circuit is well-known. Since the transistors shown are P-type enhancement MOS transistors, a $V^-$ input applied to the gate electrode causes the conduction path determined by the drain and source electrodes to exhibit a low impedance, high conduction path. The voltage of output point 11 will therefore be at $V^+$ (logic 0) if either one or all of the signals applied to the gates of transistors 10, 12 or 14 is $V^-$ (logic 1). Since the output function is an inverted alternative form of the input variables, this logic circuit is referred to as a NOR—not OR—gate. The output function may be expressed as $Y_1=\overline{A+B+C}$. Similarly, the voltage at output point 13 will be at $V^+$ (logic 0) if either one or all of the signals applied to the gates of transistors 16, 18 or 20 is $V^-$ (logic 1). The output function may be expressed as $Y_2=\overline{\bar{A}+B+C}$.

FIG. 2 embodying the invention shows the circuit for obtaining the above-named functions using four transistors. Transistors 10 and 16 have their source electrodes connected to terminal 4 and their drains to terminals 11 and 13, respectively. The binary signal shown as A is applide to the gate of transistor 10 and the complement of that variable ($\bar{A}$) is connected to the gate of transistor 16.

The drain and source of transistors 22 and 24 are interchangeable which, for a P-type device, is indicated by the two arrows pointing towards the body of the material. One of the drain and source electrodes of transistors 22 and 24 is connected to terminal 11 and the other one of said drain and source electrodes of transistors 22 and 24 is connected to terminal 13. Output load means 15 and 17 are connected between terminal 2 and output points 11 and 13, respectively.

Analysis of the circuit of FIG. 2 shows that the output at terminal 11 will be clamped to $V^+$ (logic 0) under the condition that:

(1) The gate voltage of transistor 10 is low $$(A=V^-=\text{“1”})$$

or (2) The gate voltage of transistor 16 is low $$(\bar{A}=V^-;\ A=V^+=\text{“0”})$$

and either the gate signal of transistor 20 is low $$(B=V^-=\text{“1”})$$

or the gate of transistor 22 is low ($C=V^-=$“1”).

The Boolean expression for the function at output point 11 is: $Y_1=\overline{A+\bar{A}[B+C]}$, which reduces to $$Y_1=\overline{A+B+C}$$

The output at terminal 13 will be clamped to $V^+$ (logic 0) under the condition that:

(1) The gate voltage of transistor 16 is low $$(\bar{A}=V^-=\text{“1”};\ A=\text{“0”})$$

or (2) The gate voltage of transistor 10 is low $$(A=V^-=\text{“1”})$$

and either the gate voltage of transistor 20 is low $$(B=V^-=\text{“1”})$$

or the gate of transistor 22 is low ($C=V^-=$“1”).

The Boolean expression for the function at output point 13 is: $Y_2=\overline{\bar{A}+A[B+C]}$, which reduces to $$Y_2=\overline{\bar{A}+B+C}$$

Note that $Y_1$ and $Y_2$ are identical to the results obtained with the prior art circuit. Note also that transistors 22 and 24 may conduct current from terminal 4 through transistor 16 to terminal 11 when $\bar{A}$ is low and A is high and that they may conduct current in the opposite direction from terminal 4 through transistor 10 to terminal 13 when A is low and $\bar{A}$ is high. Thus, transistors 22 and 24 act as transmission gates coupling the two output points and they provide the transmission path to generate the common terms present in each of the two output functions.

Combining the bidirectional property of transistors with the Boolean rule that $A+\bar{A}X=A+X$ yields a circuit which can generate different though related logic functions with a minimum number of components.

FIG. 2 shows only one transistor connected between each output point and the junction point denoted terminal 4. This represents the most efficient case, since for two functions of N variables having $(N-1)$ common variables $N-1$ transistors may be shared between the paired outputs for a saving of $(N-1)$ components. Note however that the invention is still applicable to those function pairs where less than $N-1$ components are common. However, the transistors associated with the non-common terms would be connected in parallel between the output points and the terminal 4.

Figure 3:
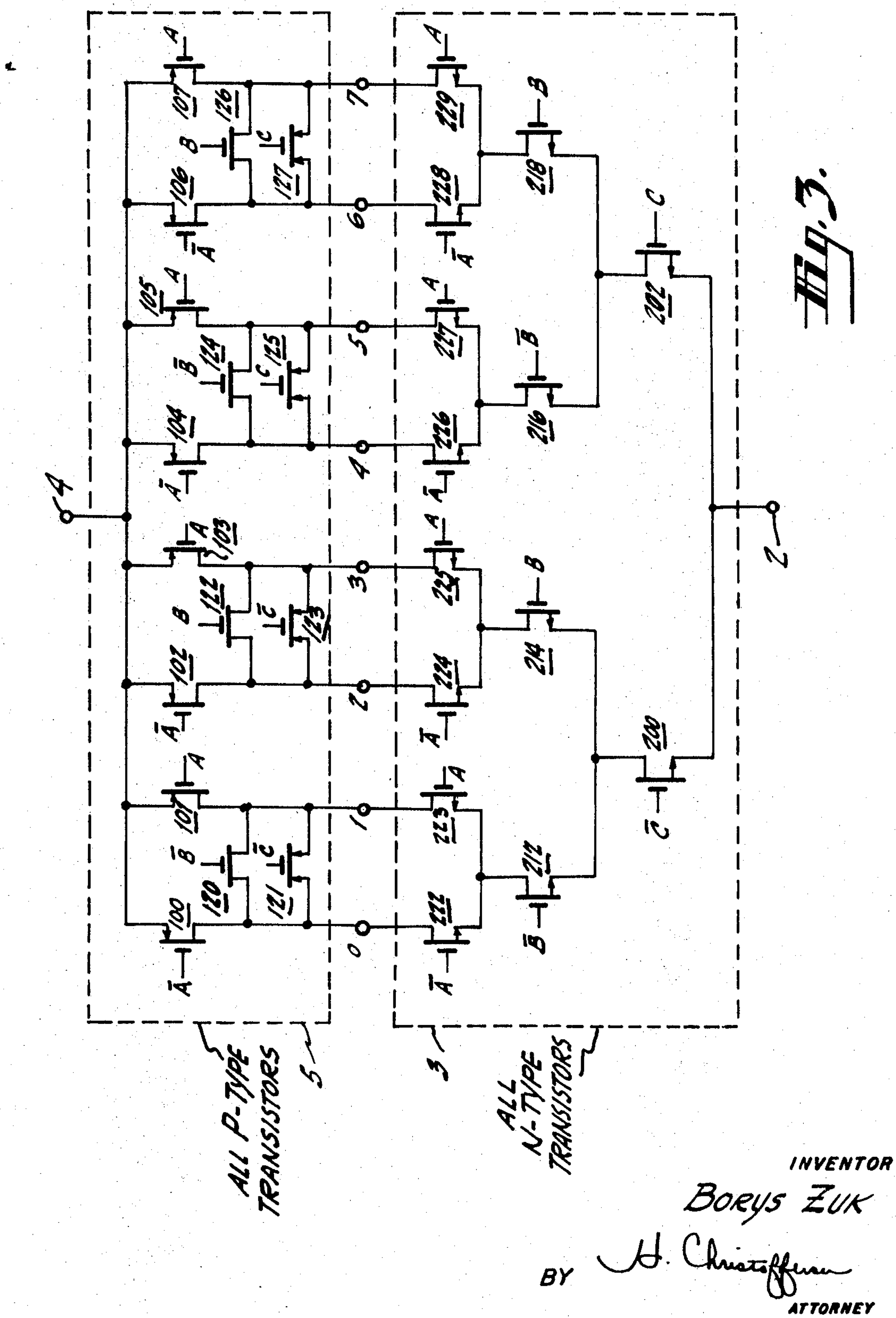
FIG. 3 is a schematic drawing of a decoder network embodying the invention in which all combinations of three variables are decoded.

A decoder circuit embodying the invention is shown in FIG. 3. FIG. 3 depicts a plurality of output points 0 . . . 7, connected by means of the components in section 3 and section 5 to terminals 2 and 4, respectively. The transistors in secton 3 are N-type MOS transistors, while those in section 5 are of the opposite conductivity type being P-type MOS transistors. Both sets of transistors are of the enhancement type.

Section 3 is a multi-level logic decoder network commonly known as a "transfer tree," which connects each output to terminal 2 by a different series combination of three transistors. The number of levels in the transfer tree equals the number of binary variables to be decoded. To decode three variables there are three levels of logic. The number of transistors at each level is equal to the number 2 raised to a power equal to the level in question. Thus, the first level has $2^1$ or two transistors (200 and 202). The second level has $2^2$ or four transistors (212, 214, 216 and 218). The third level has $2^3$ or eight transistors (222 . . . 229). Each transistor of the third level has its drain connected to a different one of the output terminals and its source paired to the source of another transistor of the third level and connected in common to a different one of the drains of the four transistors (212 . . . 218) of the second level. The sources of the four transistors of the second level are paired and each pair is connected to a different one of the drains of the transistors of the first level. The sources of transistors 200 and 202 are, in turn, connected to terminal 2. Thus, each output is connected to terminal 2 by a different combination of three transistors having their conduction paths connected in series.

Each output (0 . . . 7) is also connected by means of the conduction path of a different transistor (100 . . . 107) to terminal 4. The outputs are paired and interconnected by means of the conduction paths of two coupling transistors connected in parallel. The 0 and 1 outputs are interconnected by the drain-to-source paths of transistors 120 and 121. The output points 2 and 3 are interconnected by means of transistors 122 and 123. The output points 4 and 5 are interconnected by means of transistors 124 and 125, and the output points 6 and 7 are interconnected by means of transistors 126 and 127.

Since the coupling transistors are used as transmission gates and can conduct current in either direction, their sources and drains are interchangeable as indicated by the two arrows pointing to the body of the material for P-type devices.

The sequence of the decorded outputs is determined by the assignment of the gate voltages since it is the gate voltage which determines whether the transistor is in the high or low conduction state. Using the sequence for three binary variables as shown in Table I and referring to FIG. 3, the operation of the circuit may now be described.

TABLE I

| $\overline{A}$ | $\overline{B}$ | $\overline{C}$ | Decimal Output |
|---|---|---|---|
| 0 | 0 | 0 | 0 |
| 1 | 0 | 0 | 1 |
| 0 | 1 | 0 | 2 |
| 1 | 1 | 0 | 3 |
| 0 | 0 | 1 | 4 |
| 1 | 0 | 1 | 5 |
| 0 | 1 | 1 | 6 |
| 1 | 1 | 1 | 7 |

Taking the 0 output as an example and as an illustration of the operation of the circuit, it will be shown that the 0 output, as well as all the other outputs, is always positively clamped to either one of the two logic levels. When variables $A=B=C=V^-$ (logic 1), their inverse or complement $\overline{A}=\overline{B}=\overline{C}=V^+$ (logic 0). $\overline{A}=\overline{B}=\overline{C}=V^+$ (logic 0) being applied to the gates of the N-channel transistors 200, 212, and 222, these devices are turned "on" and the 0 output is clamped to terminal 2. (Terminal 2 being connected to $V^-$ determines the logic "1" level). It is only when the three inputs $\overline{A}$, $\overline{B}$ and $\overline{C}$ are $V^+$ that the 0 output will be clamped to $V^-$. It remains to be shown that for the above-stated condition the transistors in section 5 do not provide a conduction path between the 0 output and terminal 4 and that for all other combinations of the three variables the transistors in section 5 provide a low impedance, high conduction path between the output 0 and terminal 4.

Examination of the circuit shows that the 0 output is connected to terminal 4 by means of the conduction path of transistors 100 "or" in the alternative by means of the conduction path provided by transistor 101 "and" the conduction path of either of transistors 120 "or" 121. Thus, the 0 output is equal to $V^+$ (logic 0) when $\overline{A}$ is 1 or when A is 1 "and" either B "or" C is 1. Expressed in Boolean terms, the 0 output is equal to $\overline{[\overline{A}+A[\overline{B}+C]]}$ which reduces to $0=\overline{\overline{A}+\overline{B}+\overline{C}}$. Thus, 0 is disconnected from terminal 4 if, and only if, $\overline{A}=\overline{B}=\overline{C}=V^+$ (logic 0) which is compatible with the condition that 0 be clamped to terminal 2 for that combination of A, B and C. For any other combination of A, B or C, the 0 output is clamped to terminal 4.

The 1 decoded output is clamped to terminal 2 when the gates of transistors 200, 212 and 213 are fed enabling signals. This occurs when $A=\overline{B}=\overline{C}=V^+$ (logic 0). For all other combinations of the three binary variables, the series path comprising transistors 200, 212 and 223 will present a very high impedance path. The 1 output is clamped to terminal 4 when a 1 is fed to the gate of transistor 101 or when a 1 is fed to the gate of transistor 100 and to the gate of either transistor 120 or transistor 121. Expressed in Boolean form the 1 output is equal to $\overline{A+\overline{A}[\overline{B}+\overline{C}]}$ which reduces to $1=\overline{A+\overline{B}+\overline{C}}$.

Since the transmission of $\overline{B}$ and $\overline{C}$ is common to both 0 and 1, the circuit of FIG. 3 shows how cross-coupling may be used to save two $(N-1)$ transistors per decoded output pair.

The other decoded outputs operate exactly as described for the 0 and 1 decode, and need no further discussion since they all use principles described. Suffice it to say, that for a three variable decode network two transistors are saved per decoded pair.

Figure 4:
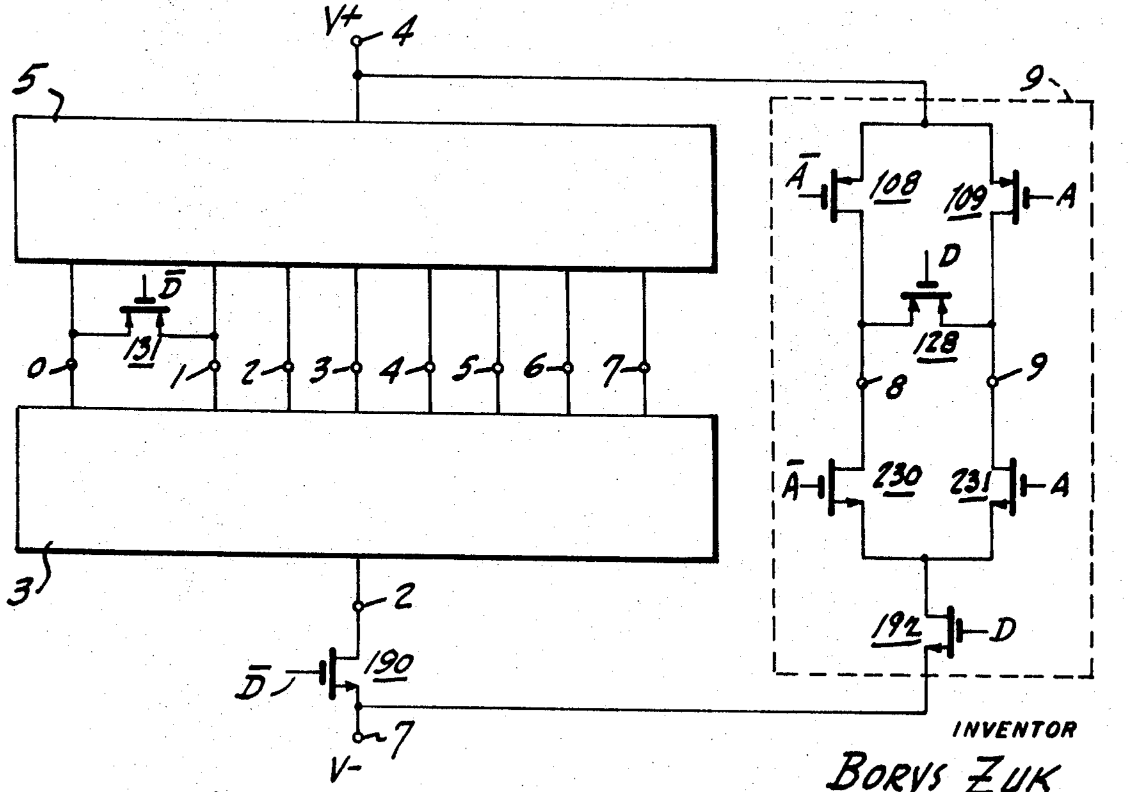
FIG. 4 is a schematic drawing of a binary-to-decimal converter wherein the variables are generated by a binary coded decimal (BCD) counter.

FIG. 4 is another circuit embodying the invention in which the outputs of a binary coded decimal (BCD) counter are converted to decimal outputs. Since the counter is reset at the tenth pulse only ten possible combinations of four variables may be generated as shown in Table II.

TABLE II

| Decimal Output | $\overline{A}$ | $\overline{B}$ | $\overline{C}$ | $\overline{D}$ |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |

Analysis of the table shows that only the decimal zero and the decimal one require four variables to be differentiated from any other combination. The decimals 3 through 7 inclusive need only three binary variables to be uniquely defined and the decimals 8 and 9 require only two variables to be uniquely defined. Consequently, the numbers 0 and 1 require a four-bit decode while the numbers 3 through 7 require a three-bit decode and the numbers 8 and 9 require only a two-bit decode.

FIG. 4 shows the addition of transistor 131 connected between the 0 and 1 outputs in parallel with transistors 120 and 121 of section 5 and the addition of transistor 190 in series with the transistors of section 3 to render the decode of 0 and 1 a four-bit (four binary variable) decode according to the invention. The $V^-$ source of potential is connected to terminal 7, which is common to the sources of transistors 190 and 192. The 0 output reduces to $0=\overline{\overline{A}+\overline{B}+\overline{C}+\overline{D}}$ and the 1 output reduces to $1=\overline{A+\overline{B}+\overline{C}+\overline{D}}$. The two outputs share the transmission paths generated by the three transistors 120, 121 and 131 representing the $\overline{B}$, $\overline{C}$ and $\overline{D}$ variables for a net saving of three transistors per decoded pair where each output is a function of four variables.

The decoding of decimals 2 through 7 is the same as for FIGS. 1 and 2. Note that the addition of transistor 190 is not necessary for these numerals since the signal applied to the gate of transistor 190 does not change for the eight combinations 0–7. Numerals 8 and 9 are obtained by decoding the two variables A and D, which is shown set off in the dashed box 9. For a two-bit decode one cross-coupling transistor 128 is connected between output points 8 and 9. The drain of transistor 192 is connected to the sources of transistors 230 and 231 whose drains are respectively connected to output points 8 and 9, thereby forming the series combination between $V^-$ and each of the two output points.

The two-bit decode is the simplest form of the invention. Since the D variable occurs in its unprimed form only for the eighth and ninth decimals, these two numerals are uniquely defined by decoding two variables. The 8 output reduces to $8=\overline{\overline{A}+D}$ and the 9 output reduces to $9=\overline{A+D}$.

Restating the general statement of the invention, it has been shown that the circuitry required to generate two related functions may be minimized where the two functions are related by having some common terms and, in addition, when the non-common terms of one function are the complement of the non-common terms of the other.

The circuits embodying the invention have been shown using P-type transistors, it should be obvious to one skilled in the art that N-type transistors may also be used to practice the invenion if the gate and supply voltages are suitably interchanged.

It should also be obvious that the arbitrary selection of what is commonly termed "negative logic" to describe the operation of the circuits and the ensuing description of a gate as a NOR gate rather than as a NAND or AND gate does not affect or change any aspect of the invention.

What is claimed is:

1. The combination comprising:

first and second output points, a first junction point, and a plurality of transistors, each transistor having first and second electrodes defining a conduction path and a control electrode to control the conductivity of said conduction path;

each of said transistors having its conduction path connected between any two of (a) said first and (b) second output points and (c) said first junction point, and at least one transistor being connected between each pair of said points;

means for applying signals having either a first or a second value to the control electrodes of said transistors, and wherein the signals applied to the control electrodes of the transistors connected between the first output point and the first junction point are the complement of the signals applied to the control electrodes of the transistors connected between said second output point and said first junction point; and different output load means connected to each of said first and second output points.

2. The combination as claimed in claim 1, wherein the transistors connected between the first and second output points when enabled conduct current in a direction dependent upon the conducting states of the other transistors; and wherein the transistors connected between each of the two output points and the first junction point conduct current in only one direction.

3. The combination as claimed in claim 2, wherein the transistors are insulated-gate field-effect transistors, and further including a source of potential connected to said first junction point and said output load means.

4. The combination comprising:

a plurality of output points, first and second junction points, a plurality of transistors of a first conductivity type and a plurality of transistors of the opposite conductivity type;

each different output point being coupled to the first junction point by a different series combination of N transistors of the first conductivity type, where N is an integer greater than one;

pairing means connecting said output points in pairs, each said pairing means comprising the parallel combination of $N-1$ transistors of the opposite conductivity type connected between the first and second output points of a pair;

a first transistor of said opposite conductivity type connected between the first output point of a pair and the second junction point; and a second transistor of opposite conductivity type connected between the second output point of a pair and the second junction point.

5. The combination as claimed in claim 4, wherein each transistor has a first and second electrode defining a conduction path and a control electrode whose applied potential determines the conductivity of said conduction path:

wherein said series combination of N transistors comprises N transistors having their conduction paths connected in series;

wherein said parallel combination of $N-1$ transistors comprises $N-1$ transistors having their conduction paths connected in parallel;

wherein said first and second transistors of opposite conductivity type have their conduction paths connected between the second junction point and the first and second output points, respectively; and further including a source of operating potential connected between said first and second junction points.

6. The combination as claimed in claim 5, further including means for applying signals, having either a first value or a second value, to the control electrodes of said transistors; and wherein the transistors comprising said parallel combination of $N-1$ transistors, in response to one of the signals of the first and second value, conduct current in a direction dependent upon the conducting states of said first and second transistors.

7. The combination as claimed in claim 6, wherein a first signal is applied to the control electrode of said first transistor and to the control electrode of one of the N transistors of the first conductivity type connected in series with said first output point of a pair; and wherein the complement of said first signal is applied to the control electrode of said second transistor and to the control electrode of one of the N transistors of the first conductivity type connected in series with said second output point of the pair.

8. The combination as claimed in claim 7, wherein $N-1$ other, different signals are applied to the control electrodes of the parallel combination of $N-1$ transistors, and to the control electrodes of $N-1$ transistors of the series combination of N transistors of the first conductivity type.

9. The combination as claimed in claim 8, wherein the transistors are insulated-gate field-effect transistors.

References Cited

UNITED STATES PATENTS

| | | | |
|---|---|---|---|
| 3,252,011 | 5/1966 | Zuk | 307—251 |
| 3,292,008 | 12/1966 | Rapp | 307—251 |

DONALD D. FORRER, Primary Examiner

H. A. DIXON, Assistant Examiner

U.S. Cl. X.R.

307—251, 205